US011038552B2

(12) United States Patent
Forster

(10) Patent No.: US 11,038,552 B2
(45) Date of Patent: Jun. 15, 2021

(54) REMOTE MONITORING OF DATA COMMUNICATION BETWEEN AN RFID DEVICE AND READER SYSTEM

(71) Applicant: AVERY DENNISON RETAIL INFORMATION SERVICES, LLC, Mentor, OH (US)

(72) Inventor: Ian J. Forster, Chelmsford (GB)

(73) Assignee: Avery Dennison Retail Information Services, LLC, Mentor, OH (US)

(*) Notice: Subject to any disclaimer, the term of this patent is extended or adjusted under 35 U.S.C. 154(b) by 0 days.

(21) Appl. No.: 16/168,993

(22) Filed: Oct. 24, 2018

(65) Prior Publication Data
US 2019/0123784 A1 Apr. 25, 2019

Related U.S. Application Data

(60) Provisional application No. 62/576,167, filed on Oct. 24, 2017.

(51) Int. Cl.
H04B 5/00 (2006.01)
G06K 19/07 (2006.01)
(Continued)

(52) U.S. Cl.
CPC ....... *H04B 5/0031* (2013.01); *G06K 7/10237* (2013.01); *G06K 19/0709* (2013.01);
(Continued)

(58) Field of Classification Search
CPC ..... H04W 4/80; H04B 5/0031; H04B 5/0075; H04B 5/0037; H04B 5/0062;
(Continued)

(56) References Cited

U.S. PATENT DOCUMENTS 8,674,810 B2 3/2014 Uysal et al.
2007/0229250 A1* 10/2007 Recker ................ H05B 45/37
340/531

(Continued)

FOREIGN PATENT DOCUMENTS

CN 101135728 3/2008
CN 105529032 4/2011
(Continued)

OTHER PUBLICATIONS

International Search Report and Written Opinion of ISA/EPO dated Jan. 16, 2019 prepared for PCT/2017/057217.
(Continued)

*Primary Examiner* — Nhan T Le

(57) ABSTRACT

An RFID device is provided with an RFID component such as a chip, a signal device, and an antenna, which are all electrically coupled together. The antenna is configured to deliver energy to the signal device upon receiving a near-field communication. The signal device is configured to generate, upon receiving the energy from the antenna, a response that is indicative of the antenna receiving the near-field communication. The response is not a near-field
(Continued)

communication, but may be an emission (e.g., emission of light) or a change in a characteristic of the signal device, for example. A system may employ the RFID device in combination with a receiver, which wirelessly detects the response. The receiver may deliver a signal to a host system which, upon receiving the signal, generates its own response, with the signal and the response of the host system being in some form other than a near-field communication.

20 Claims, 3 Drawing Sheets

(51) Int. Cl.
  G06K 7/10 (2006.01)
  G06K 19/077 (2006.01)
  H04W 4/80 (2018.01)
(52) U.S. Cl.
  CPC ... G06K 19/0723 (2013.01); G06K 19/07703 (2013.01); G06K 19/07766 (2013.01); H04B 5/0037 (2013.01); H04B 5/0062 (2013.01); H04B 5/0075 (2013.01); H04W 4/80 (2018.02)
(58) Field of Classification Search
  CPC ........... G06K 19/0709; G06K 19/0723; G06K 19/07766; G06K 7/10237
  See application file for complete search history.

(56) References Cited

U.S. PATENT DOCUMENTS

| | | | |
|---|---|---|---|
| 2010/0127828 A1* | 5/2010 | Connolly | G06K 7/0008 340/10.1 |
| 2010/0271187 A1* | 10/2010 | Uysal | G06K 7/0008 340/10.4 |
| 2011/0289023 A1 | 11/2011 | Forster et al. | |
| 2012/0105210 A1 | 5/2012 | Smith et al. | |
| 2018/0227933 A1* | 8/2018 | Rubin | H04L 1/0027 |

FOREIGN PATENT DOCUMENTS

| | | |
|---|---|---|
| CN | 102487608 | 6/2012 |
| CN | 103119615 | 5/2013 |
| CN | 106529611 | 3/2017 |
| CN | 206249373 U | 6/2017 |
| JP | 2012-032954 | 2/2012 |
| WO | 2017077140 | 5/2017 |

OTHER PUBLICATIONS

International Preliminary Report on Patentability dated May 7, 2020 issued in corresponding IA No. PCT/US2018/057217 filed Oct. 24, 2018.

* cited by examiner

REMOTE MONITORING OF DATA COMMUNICATION BETWEEN AN RFID DEVICE AND READER SYSTEM

CROSS REFERENCE TO RELATED APPLICATION(S)

The present application claims priority to and the benefit of U.S. provisional utility patent Application No. 62/576,167 filed on Oct. 24, 2017, which is incorporated herein by reference in its entirety.

BACKGROUND

Field of the Disclosure

The present subject matter relates to radio frequency identification ("RFID") devices. More particularly, the present subject matter relates to RFID devices used in remotely monitoring the operation of near-field communication (hereinafter "NFC") devices.

Description of Related Art

Devices incorporating NFC technology are widespread and capable of a variety of functions. For example, a mobile telephone with NFC technology may be used to wirelessly share data with a second mobile telephone (or any other device) with NFC technology by bringing the two NFC-enabled devices into close proximity with each other. Credit cards and the like with NFC technology may be used to wirelessly transfer funds for making secure payments.

Communications via NFC technology have a very limited range (on the order of a few centimeters) compared to communications via RFID technology, which may have a range of several centimeters (at low and high frequencies) to several meters (at ultra-high frequencies). Due to the enhanced range of RFID communications, an RFID-enabled device which detects an NFC data transfer may be capable of a response that is impossible to achieve using only NFC technology. Accordingly, it may be desirable for an RFID device to monitor NFC data transfers and generate a response upon detecting an NFC data transfer.

SUMMARY

There are several aspects of the present subject matter which may be embodied separately or together in the devices and systems described and claimed below. These aspects may be employed alone or in combination with other aspects of the subject matter described herein, and the description of these aspects together is not intended to preclude the use of these aspects separately or the claiming of such aspects separately or in different combinations as may be set forth in the claims appended hereto.

In one aspect, an RFID device includes an RFID chip and a signal device electrically coupled to the RFID chip. The RFID device also includes an antenna electrically coupled to the RFID chip and to the signal device and configured to deliver energy to the signal device upon receiving a near-field communication. The signal device is configured to generate, upon receiving energy from the antenna, a response that is indicative of the antenna receiving the near-field communication, with the response being in some form other than a near-field communication.

In another aspect, a system for monitoring near-field communications includes an RFID device and a receiver. The RFID device includes an RFID chip and a signal device electrically coupled to the RFID chip. The RFID device also includes an antenna electrically coupled to the RFID chip and to the signal device and configured to deliver energy to the signal device upon receiving a near-field communication. The signal device is configured to generate, upon receiving energy from the antenna, a response that is indicative of the antenna receiving the near-field communication, with the signal being in some form other than a near-field communication. The receiver is configured to wirelessly detect the response.

In yet another aspect, a method is provided for monitoring near-field communications. The method includes receiving a near-field communication and generating a response that is indicative of receipt of the near-field communication, with the response taking some form other than a near-field communication. The response is wirelessly detected and may serve as the basis for generation of a signal, which may serve as the basis for a second response, with the signal and second response taking some form other than a near-field communication.

In other aspects or embodiments, the disclosure uses optical emission from an RFID component such as a tag, label or the like with a light-emitting diode ("LED") or other light source to monitor bi-directional communications between the RFID component and a reader-to-RFID component and/or RFID component-to-reader data stream.

In aspects or embodiments, RFID components such as tags, labels or the like include an optical output, such as an LED light source, powered by a wireless energy source of an NFC-enabled device, such as a mobile telephone or a "smartphone", to provide energy for a visual signature while also allowing monitoring of the reader-to-RFID component and/or RFID component-to-reader data stream, utilizing the effect that an LED or the like coupled across the RFID component will have its emission modulated by the data communications.

In other aspects or embodiments, the disclosure uses an optical emitter separate from an RFID component such as a tag, label or the like with light emitting diode ("LED") or other light source to monitor bi-directional communications between the RFID component and a reader-to-RFID component and/or RFID component-to-reader data stream. The separate optical emitter is in the form of a label or the like placed in proximity to the RFID component, coupling to the separate optical emitter and the RFID, while allowing remote monitoring of the data communications between the reader and the RFID component.

DESCRIPTION OF THE ILLUSTRATED EMBODIMENTS

The embodiments disclosed herein are exemplary only, and the subject matter described herein may be embodied in various forms. Therefore, specific details disclosed herein are not to be interpreted as limiting the subject matter as defined in the accompanying claims.

Figure 1:
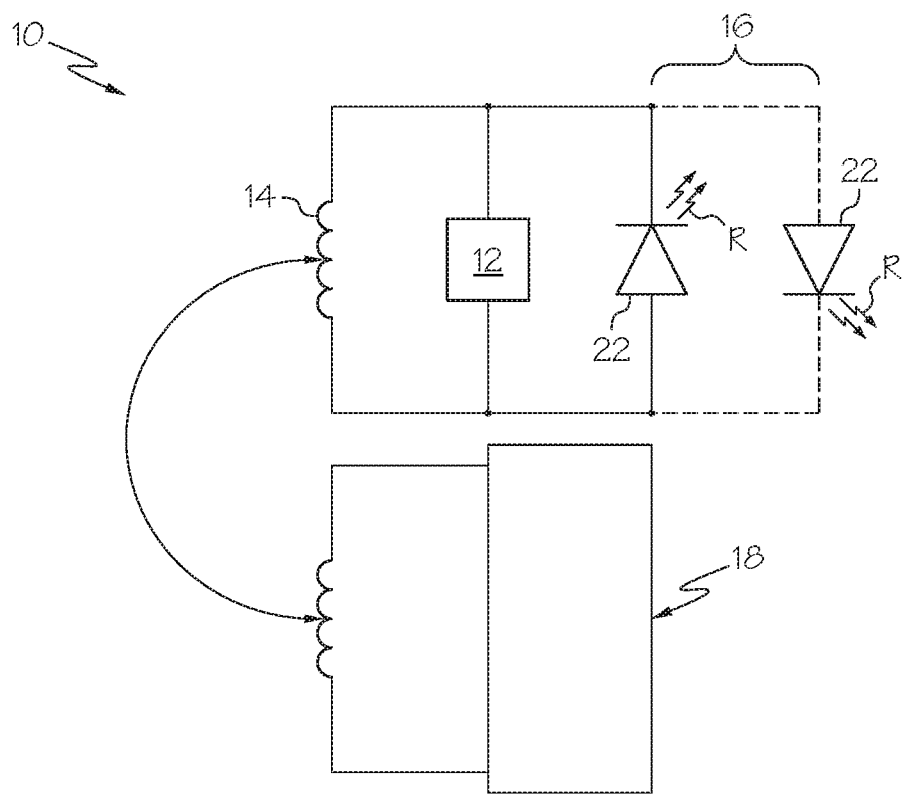
FIG. 1 is a schematic view of an RFID device according to an aspect of the present disclosure in wireless communication with an RFID reader.

FIG. 1 shows an RFID device or tag 10 according to an aspect of the present disclosure. The RFID device 10 includes an RFID chip 12, which is electrically coupled to a coil or antenna 14 and to a signal device 16.

The RFID chip 12 may take any of a number of forms (including those of the type commonly referred to as a "chip" or a "strap" by one of ordinary skill in the art), including any of a number of possible components and being configured to perform any of a number of possible functions. For example, in one embodiment, the RFID chip 12 includes an integrated circuit for controlling RF communication and other functions of the RFID device 10.

The antenna 14 is illustrated as a coil, which communicates wirelessly with an RFID reader 18. In this embodiment, the antenna 14 is configured to operate at high frequency. For this embodiment, the antenna operates at 13.56 MHz, which is the same frequency at which near-field communications are transmitted. By providing an RFID device 10 configured to operate at 13.56 MHz, the RFID device 10 is capable of communicating with an RFID reader 18 from which the RFID device 10 may receive power (as in FIG. 1) and/or an NFC-enabled device 20 (e.g., a mobile telephone), as shown in FIG. 2.

The signal device 16 may be variously configured and variously coupled to the other components of the RFID device 10 without departing from the scope of the present disclosure. For example, in the illustrated embodiment, the signal device 16 is shown as a pair of light-emitting diodes ("LEDs") 22, which are connected in parallel to the other components of the RFID device 10. In other embodiments, the signal device 16 may be connected in series with the other components of the RFID device 10 and/or may be provided in some form other than a light-emitting diode, such as another light source or energy source.

Figure 2:
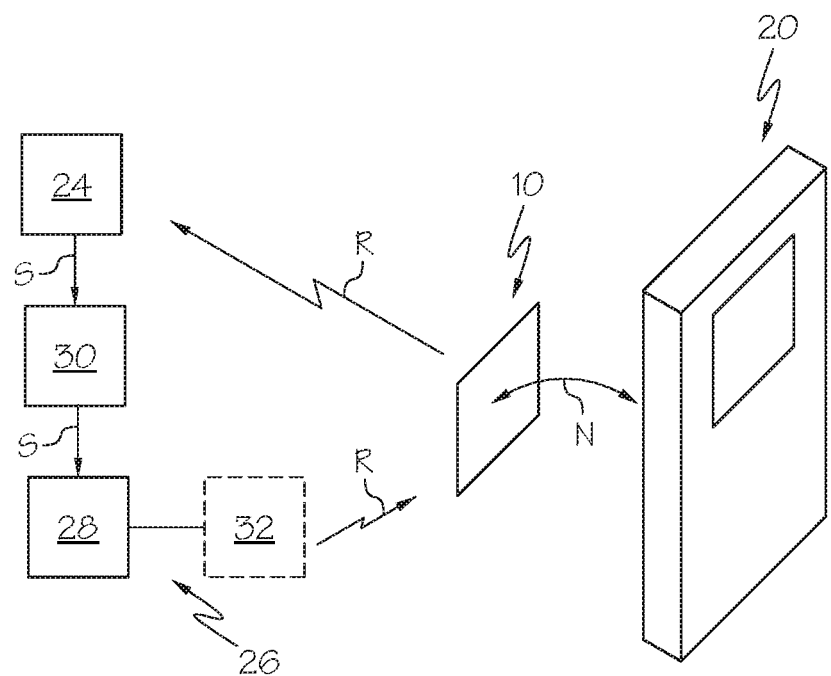
FIG. 2 is a schematic view of a system incorporating the RFID device of FIG. 1.

When the RFID device 10 is in close proximity to an NFC-enabled device 20 (such as illustrated in FIG. 2), the antenna 14 delivers energy to the signal device 16. When the signal device 16 receives this energy from the antenna 14, it generates a response (identified generally at "R" in FIGS. 1 and 2) that is indicative of the antenna 14 receiving the near-field communication (identified generally at "N" in FIG. 2) from the NFC-enabled device 20. The magnitude of the response (e.g., the amplitude of the light emission if the signal device 16 is a light source) depends upon the nature (e.g., the amplitude) of the near-field communication received by the antenna 14. Additionally, the RFID chip 12 may be configured to adjust a characteristic of the response by load modulation.

When the antenna 14 ceases receiving the near-field communication from the NFC-enabled device 20, it ceases delivering such energy to the signal device 16, thereby ending the response "R" being generated by the signal device 16. The signal device 16 thus provides an indication that there is an ongoing communication between the RFID device 10 and the NFC-enabled device 20.

The response "R" generated by the signal device 16 may be detected, such as by a receiver 24 in FIG. 2. As the range of a near-field communication is limited, it is advantageous for the response to take some other form than a near-field communication, particularly some other form that may be detected by the receiver 24 at a range that is greater than the range of a near-field communication. For example, the response "R" may take the form of an emission or a change in a characteristic of the signal device 16 that is detectable by the receiver 24 at a range that is greater than the range of a near-field communication. If the signal device 16 is a light-emitting diode (as in FIG. 1), the response "R" may take the form of light in the visible or invisible (e.g., infrared or ultraviolet) spectrum, which is detected by the receiver 24. If the receiver 24 is configured to detect light, it should be understood that the signal device 16 may take the form of any other light source, although a light-emitting diode may be advantageous in that it may operate with minimal energy input. Indeed, the nature of the signal device 16 is limited only by the energy required to operate the signal device 16, which is dependent upon the energy provided to the antenna 14 from the NFC-enabled device 20.

FIG. 2 illustrates a system 26 for wirelessly detecting the response "R" of the signal device 16 to generate a second response (identified generally at "R'" in FIG. 2). In the embodiment of FIG. 2, the signal device 16 of the RFID device 10 is a light source configured to emit an infrared light. Upon the antenna 14 of the RFID device 10 receiving a near-field communication "N" from an NFC-enabled device 20, the signal device 16 emits infrared light (i.e., a response "R") that is detected by an infrared light detector or receiver 24 at a distance that may be greater than the range of a near-field communication. Upon receiving the response "R", the receiver 24 may convert the response "R" into two data streams—reader-to-tag and tag-to-reader—and delivers a signal (identified generally at "S" in FIG. 2) to a host system 28 (illustrated in FIG. 2 with a processor 30 acting as an intermediary between the receiver 24 and the host system 28). Upon receiving the signal "S" from the receiver 24, the host system 28 generates a second response "R'", which may take any of a number of forms. In one embodiment, the second response "R'" takes the form of the host system 28 enabling wireless data communication devices 32, such as Bluetooth®, Wi-Fi, and cellular modems (as in FIG. 2); modifying a website; or changing some aspect of a display. For example, if the near-field communication "N" comprises an interaction between a mobile telephone and an RFID device 10 incorporated into a point-of-sale display, the second response "R'" may take the form of changing some aspect of the display or operating a projector.

Figure 3:
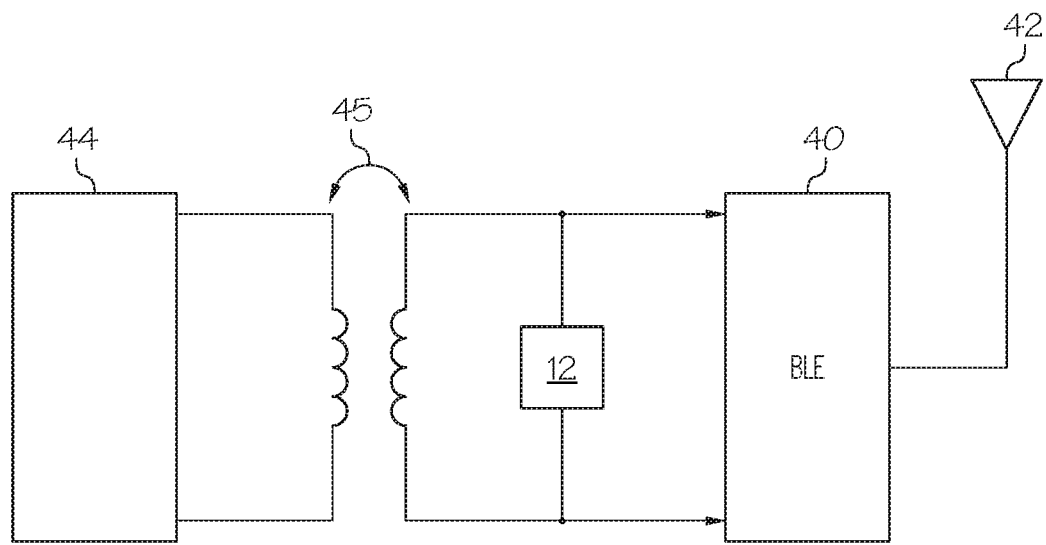
FIG. 3 is a schematic view of a Bluetooth® module being powered by at least one detected signal.

FIG. 3 illustrated one embodiment where the power from/across NFC chip 12 is used to power a Bluetooth® chip 40 which rectifies the AC signal where the chip can either receive and transmit when power is available or transmit only in the form of a beacon transmission. An RFID device includes an RFID chip and a signal device/NFC reader 44 coupled 45 to the RFID chip. In one embodiment the chip is coupled electrically but the present invention is not limited to any particular type of coupling The RFID device may include at least one antenna 42 coupled to the RFID chip and to the signal device, configured to deliver energy to the signal device upon receiving a communication, such as a near field communication. The signal device is configured to generate, upon receiving energy from the antenna, a response that is indicative of the antenna receiving the communication, with the response being in the form of a Bluetooth® transmission. The data carried on the transmission may be, in one embodiment, energy received from the antenna or data signals associated with the coupling of the antenna and the signal device.

In another embodiment, the power received by RFID device 12 activates the Bluetooth® transmitter 16. The Bluetooth® transmitter receives energy and converts it into a continuous power supply by using energy storage to remove amplitude modulation associated with the incoming signal and the response of the RFID chip 12.

Figure 4:
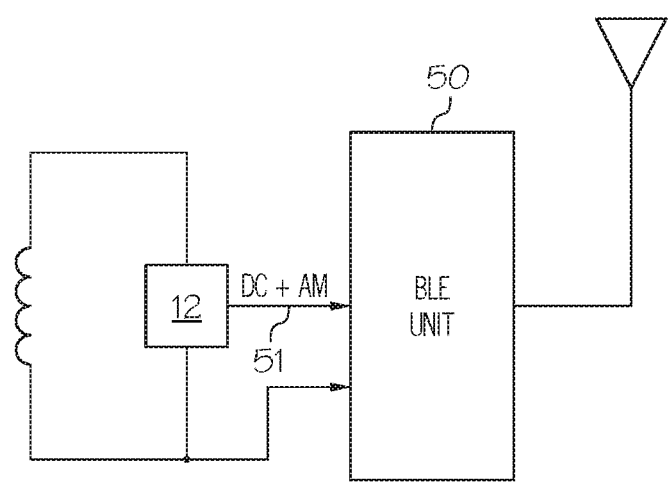
FIG. 4 is a schematic view of a Bluetooth® chip being powered by a rectified NFC signal.

FIG. 4 shows an alternate embodiment where the power from the NFC signal is rectified by NFC chip 12 and provided as a DC supply 51 to the Bluetooth® chip 50. The DC supply may have the amplitude of the 13.56 MHz signal as a form of baseband modulation present depending on the filtering applied to the rectified signal.

In another embodiment, the power received by RFID device 12 activates the Bluetooth® transmitter 16. The Bluetooth® transmitter receives energy and converts it into a continuous power supply by using energy storage to remove amplitude modulation associated with the incoming signal and the response of the RFID chip 12, but also uses the power with the amplitude modulation present to modulate the transmitted power of the Bluetooth® transmission. This allows at least two communications to be sent on the Bluetooth® transmission such as, but not limited to, its own GFSK data carrying signal and an AM signal carrying the data associated with changes in the power provided by RFID device 12.

Figure 5:
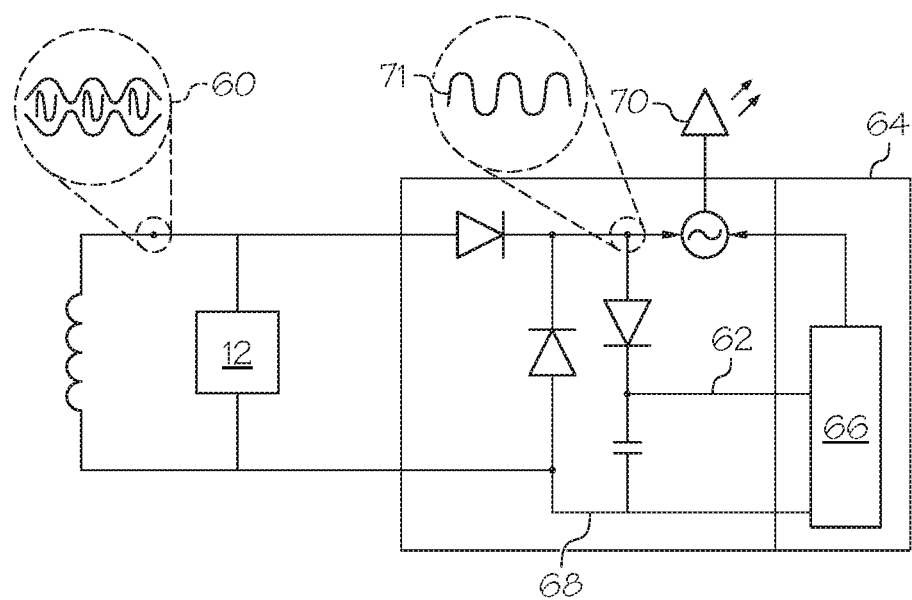
FIG. 5 is a schematic view of a Bluetooth® chip being powered and having a modulation applied by an incoming signal.

FIG. 5 shows an alternate embodiment, where the 13.56 MHz signal across chip 12 is applied to the Bluetooth® chip 64 having a modulation port 70. The Bluetooth® chip rectifies the incoming signal with two integrating filters. In one embodiment the Bluetooth® chip 64 has a logic block 66 and a storage capacitor 68. While the present embodiment addresses two integrating filters, the present invention is not limited to any number of filters. Filter one may remove the 13.56 MHz signal but filter one may retain the lower frequency modulation associated with data transmission between the RFID chip and reader. A second filter or filter two if utilized may deliver the smoothed signal with all modulation removed as a DC supply to the chip. In one embodiment presently contemplated, the detected signal 71 via filter one is applied to an oscillator associated with the 2.45 GHz transmission, either modulating its amplitude or frequency with the data carrying envelope of the 13.56 MHz signal to be transmitted on the same carrier as the GFSK Bluetooth® transmission. In one embodiment, the Bluetooth® transmission is triggered by some feature of the data carrying envelope, allowing synchronization of the Bluetooth® transmission and data being present to be used as a secondary modulation. In a further embodiment the 13.56 MHz AC signal provides the following to the Bluetooth® chip, a DC power supply 62, a secondary detected modulation representing the NFC communication to be used to modulate 60 the amplitude or frequency of the Bluetooth® transmission and a frequency reference for the 2.45 GHz transmission from the Bluetooth® chip.

One benefit of systems and methods according to the present disclosure is that they will work when no form of RF communication between the NFC-enabled device 20 and the host system 28 is available, such as when a train car or carriage is between stations or over very long ranges, such as in parks and open areas. Thus, it may be preferred for the second response "R'" and the signal "S" generated by the receiver 24 to take a form other than a near-field communication for providing enhanced range.

While it may be advantageous to wirelessly detect the response "R" of the signal device 16 at a range that is greater than the range of a near-field communication, it is also within the scope of the present disclosure for the response "R" itself to be interpretable as useful information. For example, if the response "R" is the emission of visible light, then it provides a user with visual evidence of a successful near-field communication between the RFID device 10 and the NFC-enabled device 20. In one embodiment, the signal device 16 may comprise one light source configured to emit infrared light as a response "R" (which is readily detected from a remote location) and one light source configured to emit visible light (e.g., a blue light) as a response "R" for enhanced visual appeal. In another embodiment, ultraviolet light emitted as a response "R" may be used in combination with fluorescent materials for differently enhanced visual appeal. In yet another embodiment, in which the RFID device 10 is incorporated into a help point, the visual indicia provided by the response "R" may act as an alert that assistance is required at the help point.

It will be understood that the embodiments described above are illustrative of some of the applications of the principles of the present subject matter. Numerous modifications may be made by those skilled in the art without departing from the spirit and scope of the claimed subject matter, including those combinations of features that are individually disclosed or claimed herein. For these reasons, the scope hereof is not limited to the above description but is as set forth in the following claims, and it is understood that claims may be directed to the features hereof, including as combinations of features that are individually disclosed or claimed herein.

The invention claimed is:

1. An RFID device, comprising:
   an RFID component;
   a signal device electrically coupled to the RFID component, where the signal device comprises a light-emitting diode; and
   an antenna electrically coupled to the RFID component and to the signal device and configured to deliver energy to the signal device upon receiving a near-field communication, wherein
   the signal device is configured to generate, upon receiving energy from the antenna, a response that is indicative of the antenna receiving the near-field communication, and
   where a magnitude of the response is a function of the amplitude of the near-field communication and the response is not a near-field communication.

2. The RFID device of claim 1, wherein the response comprises an emission.

3. The RFID device of claim 2, wherein the emission comprises infrared light or ultraviolet light.

4. The RFID device of claim 2, wherein the emission comprises visible light.

5. The RFID device of claim 1, wherein the signal device comprises a pair of light-emitting diodes.

6. The RFID device of claim 1, wherein the response comprises a change in a characteristic of the signal device.

7. The RFID device of claim 1, wherein the RFID component is configured to adjust a characteristic of the response by load modulation.

8. A system for monitoring near-field communications, comprising:
   an RFID device including
   an RFID component,
   a signal device electrically coupled to the RFID component, where the signal device comprises a light-emitting diode; and
   an antenna electrically coupled to the RFID component and to the signal device and configured to deliver energy to the signal device upon receiving a near-field communication, the signal device being configured to generate, upon receiving energy from the antenna, a response that is indicative of the antenna receiving the near-field communication, where a magnitude of the response is a function of the amplitude of the near-field communication and the response is not a near-field communication; and a receiver configured to detect light to wirelessly detect the response.

9. The system of claim 8, wherein the response comprises an emission.

10. The system of claim 9, wherein the emission comprises infrared light or ultraviolet light.

11. The system of claim 9, wherein the emission comprises visible light.

12. The system of claim 8, wherein the signal device comprises a pair of light-emitting diodes.

13. The system of claim 8, wherein the response comprises a change in a characteristic of the signal device.

14. The system of claim 8, further comprising a host system, wherein the receiver is configured to deliver a signal to the host system upon detecting the response, and the host system is configured to generate, upon receiving the signal, a second response, wherein the signal and the second response are not near-field communications.

15. A method for monitoring near-field communications, comprising:

receiving a near-field communication;

generating a response that is indicative of receipt of the near-field communication;

wirelessly detecting the response, wherein the response is not a near-field communication;

generating a signal upon detecting the response; and generating a second response by a host system, where the second response comprises at least one of enabling one or more wireless data communication devices, modifying a website, or changing an aspect of a display.

16. The method of claim 15, wherein the response comprises an emission.

17. The method of claim 16, wherein the emission comprises infrared light or ultraviolet light.

18. The method of claim 16, wherein the emission comprises visible light.

19. The method of claim 15, wherein the response is generated by a signal device, and the response comprises a change in a characteristic of the signal device.

20. The method of claim 15, wherein the signal and the second response are not near-field communications.

\* \* \* \* \*